United States Patent
Das et al.

(10) Patent No.: US 12,387,718 B1
(45) Date of Patent: Aug. 12, 2025

(54) REMOVING BIAS FROM AUTOMATIC SPEECH RECOGNITION MODELS USING INTERNAL LANGUAGE MODEL ESTIMATES

(71) Applicant: Amazon Technologies, Inc., Seattle, WA (US)

(72) Inventors: Nilaksh Das, Seattle, WA (US); Monica Lakshmi Sunkara, San Jose, CA (US); Sravan Babu Bodapati, Fremont, CA (US); Jinglun Cai, Seattle, WA (US); Devang Kulshreshtha, Montreal (CA); Jeffrey John Farris, Crystal Lake, IL (US); Nicholas G Aldridge, Seattle, WA (US); Srikanth Ronanki, San Jose, CA (US); Katrin Kirchhoff, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 287 days.

(21) Appl. No.: 18/311,849

(22) Filed: May 3, 2023

(51) Int. Cl.
*G10L 15/16* (2006.01)
*G10L 15/08* (2006.01)

(52) U.S. Cl.
CPC ........ *G10L 15/16* (2013.01); *G10L 2015/081* (2013.01)

(58) Field of Classification Search
None
See application file for complete search history.

(56) References Cited

U.S. PATENT DOCUMENTS

| | | | |
|---|---|---|---|
| 12,045,568 B1* | 7/2024 | Shrivastava | G10L 15/1815 |
| 12,254,864 B1* | 3/2025 | Lajszczak | G10L 15/16 |
| 2019/0228763 A1* | 7/2019 | Czarnowski | G06N 3/04 |
| 2022/0139380 A1* | 5/2022 | Meng | G06N 3/044 |
| | | | 704/232 |
| 2022/0310062 A1 | 9/2022 | Sainath et al. | |
| 2023/0103722 A1* | 4/2023 | Rosenberg | G10L 15/063 |
| | | | 704/240 |

(Continued)

OTHER PUBLICATIONS

Higuchi, Yosuke, et al. "Mask CTC: Non-autoregressive end-to-end ASR with CTC and mask predict." arXiv preprint arXiv: 2005.08700 (2020). (Year: 2020).*

(Continued)

*Primary Examiner* — Douglas Godbold
(74) *Attorney, Agent, or Firm* — S. Scott Foster; Kowert, Hood, Munyon, Rankin & Goetzel, P.C.

(57) ABSTRACT

Bias may be removed from automatic speech recognition model predictions using internal language model estimates. Audio data may be received for speech recognition. The audio data may be processed both through an automatic speech recognition model to produce original word token predictions and masked in different portions of the audio data to produce other word token predictions for the masked audio. A comparison of the original word token predictions and the other word token predictions may provide an estimate of an internal language model for the automatic speech recognition model. This estimate can be used to modify the original word token predictions to remove the lexical bias and produce a speech prediction.

20 Claims, 7 Drawing Sheets

(56) References Cited

U.S. PATENT DOCUMENTS

| | | | | |
|---|---|---|---|---|
| 2023/0186898 | A1* | 6/2023 | Weisz | G10L 15/30 |
| | | | | 704/257 |
| 2024/0203399 | A1* | 6/2024 | Stooke | G10L 15/065 |
| 2024/0203406 | A1* | 6/2024 | Khorram | G10L 15/16 |
| 2024/0290321 | A1* | 8/2024 | Wang | G10L 15/26 |

OTHER PUBLICATIONS

Higuchi, Yosuke, et al. "Improved Mask-CTC for non-autoregressive end-to-end ASR." ICASSP 2021-2021 IEEE International Conference on Acoustics, Speech and Signal Processing (ICASSP). IEEE, 2021. (Year: 2021).*

S. Toshniwal, A. Kannan, C.-C. Chiu, Y. Wu, T. N. Sainath, and K. Livescu, "A comparison of techniques for language model integration in encoder-decoder speech recognition," in IEEE Spoken Language Technology Workshop (SLT), 2018, retrieved from arXiv:1807.10857, pp. 1-7.

Liu, Y. Gu, A. Gourav, A. Gandhe, S. Kalmane, D. Filimonov, A. Rastrow, and I. Bulyko, "Domain-aware neural language models for speech recognition," in IEEE International Conference on Acoustics, Speech and Signal Processing (ICASSP), 2021, retrieved from arXiv:2101.03229v2, pp. 1-5.

E. McDermott, H. Sak, and E. Variani, "A density ratio approach to language model fusion in end-to-end automatic speech recognition," in IEEE Automatic Speech Recognition and Understanding Workshop (ASRU), 2019, retrieved from arXiv:2002.11268v3, pp. 1-8.

C. Choudhury, A. Gandhe, X. Ding, and I. Bulyko, "A likelihood ratio based domain adaptation method for e2e models," In IEEE International Conference on Acoustics, Speech and Signal Processing (ICASSP), 2022, pp. 1-5.

W. Zhou, Z. Zheng, R. Schluter, and H. Ney, "On language model integration for RNN transducer based speech recognition," in IEEE International Conference on Acoustics, Speech and Signal Processing (ICASSP), 2022, retrieved from arXiv:2110.06841, pp. 1-5.

Z. Meng, S. Parthasarathy, E. Sun, Y. Gaur, N. Kanda, L. Lu, X. Chen, R. Zhao, J. Li, and Y. Gong, "Internal language model estimation for domain-adaptive end-to-end speech recognition," in IEEE Spoken Language Technology Workshop (SLT), 2021, retrieved from arXiv:2011.01991v1, pp. 1-8.

M. Zeineldeen, A. Glushko, W. Michel, A. Zeyer, R. Schluter, and H. Ney, "Investigating methods to improve language model integration for attention-based encoder-decoder ASR models," arXiv preprint arXiv:2104.05544, 2021, pp. 1-5.

Y. Liu, R. Ma, H. Xu, Y. He, Z. Ma, and W. Zhang, "Internal language model estimation through explicit context vector earning for attention-based encoder-decoder ASR," arXiv preprint arXiv:2201.11627, 2022, pp. 1-5.

J. Lee and S. Watanabe, "Intermediate loss regularization for CTC-based speech recognition," in IEEE International Conference on Acoustics, Speech and Signal Processing (ICASSP), 2021, retrieved from arXiv:2102.03216, pp. 1-5.

R. Fan, W. Chu, P. Chang, and J. Xiao, "CASS-NAT: CTC alignment-based single step non-autoregressive transformer for speech recognition," in IEEE International Conference on Acoustics, Speech and Signal Processing (ICASSP), 2021, retrieved from arXiv:2010.14725, pp. 1-5.

X. Zhang, F. Zhang, C. Liu, K. Schubert, J. Chan, P. Prakash, J. Liu, C.-F. Yeh, F. Peng, Y. Saraf et al., "Benchmarking LFMMI, CTC and RNN-T criteria for streaming ASR," in IEEE Spoken Language Technology Workshop (SLT), 2021, retrieved from arXiv:2011.04785, pp. 1-6.

S. Dingliwal, M. Sunkara, S. Ronanki, J. Farris, K. Kirchhoff, and S. Bodapati, "Towards Personalization of CTC Speech Recognition Models With Contextual Adapters and Adaptive Boosting," arXiv preprint arXiv:2210.09510, 2022, pp. 1-8.

A. Hannun, C. Case, J. Casper, B. Catanzaro, G. Diamos, E. Elsen, R. Prenger, S. Satheesh, S. Sengupta, A. Coates et al., "Deep speech: Scaling up end-to-end speech recognition," arXiv preprint arXiv:1412.5567, 2014, pp. 1-12.

D. Le, G. Keren, J. Chan, J. Mahadeokar, C. Fuegen, and M. L. Seltzer, "Deep shallow fusion for RNN-T personalization," in IEEE Spoken Language Technology Workshop (SLT), 2021, retrieved from arXiv:2011.07754, pp. 1-7.

E. Variani, D. Rybach, C. Allauzen, and M. Riley, "Hybrid Autoregressive Transducer (HAT)," in IEEE International Conference on Acoustics, Speech and Signal Processing (ICASSP), 2020, retrieved from arXiv:2003.07705, pp. 1-9.

A. Zeyer, R. Schluter, and H. Ney, "Why does CTC result in peaky behavior?" arXiv preprint arXiv:2105.14849, 2021, pp. 1-10.

A. Gulati, J. Qin, C. C. Chiu, N. Parmar, Y. Zhang, J. Yu, W. Han, S. Wang, Z. Zhang, Y. Wu, and R. Pang, "Conformer: Convolution-augmented transformer for speech recognition," in Proceedings of the Annual Conference of the International Speech Communication Association, Interspeech, 2020, retreived from arXiv:2005.08100v1, pp. 1-5.

S. Watanabe, T. Hori, S. Kim, J. R. Hershey, and T. Hayashi, "Hybrid CTC/attention architecture for end-to-end speech recognition," IEEE Journal of Selected Topics in Signal Processing, 2017, pp. 2623-2627.

S. Watanabe, T. Hori, S. Karita, T. Hayashi, J. Nishitoba, Y. Unno, N. E. Y. Soplin, J. Heymann, M. Wiesner, N. Chen, A. Renduchintala, and T. Ochiai, "ESPnet: End-to-end speech processing toolkit," in Proceedings of the Annual Conference of the International Speech Communication Association, Interspeech, 2018, retrieved from arXiv:1804.00015v1, pp. 1-5.

K. Heafield, "Kenlm: Faster and smaller language model queries," in Proceedings of the Sixth Workshop on Statistical Machine Translation, 2011, pp. 187-197.

V. Panayotov, G. Chen, D. Povey, and S. Khudanpur, "Librispeech: An ASR corpus based on public domain audio books," in IEEE International Conference on Acoustics, Speech and Signal Processing, 2015, pp. 1-5.

C. Wang, M. Riviere, A. Lee, A. Wu, C. Talnikar, D. Haziza, M. Williamson, J. Pino, and E. Dupoux, "VoxPopuli: A largescale multilingual speech corpus for representation learning, semi-supervised learning and interpretation," in Proceedings of the 59th Annual Meeting of the Association for Computational Linguistics and the 11th International Joint Conference on Natural Language Processing, 2021, retrieved from arXiv:2101.00390v2, pp. 1-11.

N. Das, M. Sunkara, D. Bekal, D. H. Chau, S. Bodapati, and K. Kirchhoff, "Listen, know and spell: Knowledge-infused subword modeling for improving ASR performance of OOV named entities," in IEEE International Conference on Acoustics, Speech and Signal Processing (ICASSP), 2022, pp. 1-5.

J. S. Garofolo, D. Graff, D. Paul, and D. Pallett, "CSR-I (WSJ0) Complete LDC93S6A," Linguistic Data Consortium, 1993. [Online]. Available: https://catalog.ldc.upenn.edu/LDC93S6A, pp. 1-2.

* cited by examiner

REMOVING BIAS FROM AUTOMATIC SPEECH RECOGNITION MODELS USING INTERNAL LANGUAGE MODEL ESTIMATES

BACKGROUND

Automatic speech recognition (ASR) has now become tightly integrated with daily life through commonly used real-world applications such as digital assistants, news transcription and AI-based interactive voice response telephony. Often in such practical scenarios, ASR models that are trained on some source domain training data are deployed for other target domains in which target domain training data, especially paired audio-text data, may be severely limited. External language model (LM) integration techniques have been implemented to overcome such cases of domain mismatch, wherein text-only data from the target domain is leveraged.

Figure 1:
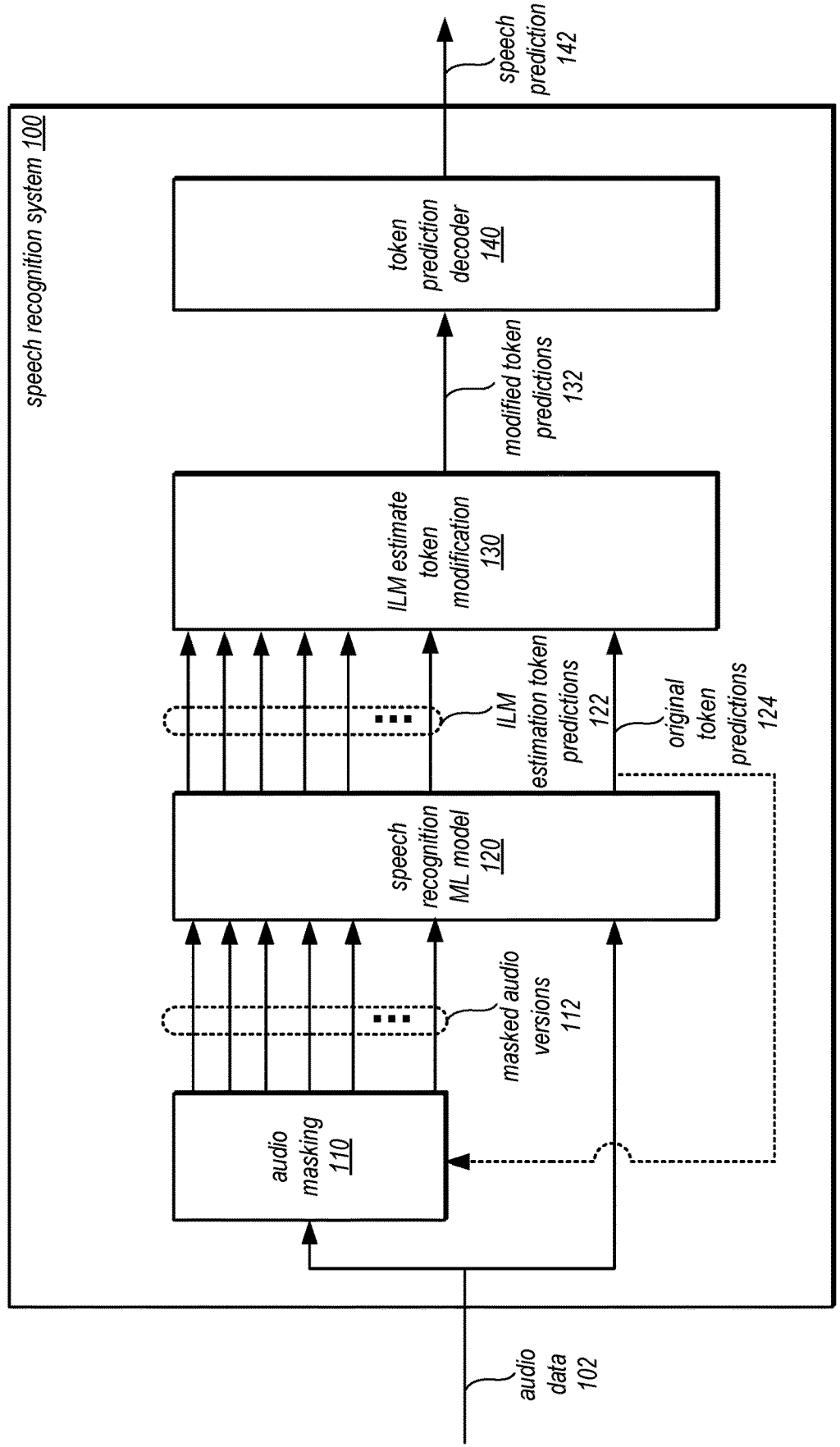
FIG. 1 illustrates a logical block diagram of removing bias from automatic speech recognition models using internal language model estimates, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for removing bias from automatic speech recognition models using internal language model estimates are described herein. End-to-end models are often used for all-neural speech recognition. Among the different types of such automatic speech recognition (ASR) models, some non-autoregressive ASR models, such as ASR models trained using Connectionist Temporal Classification (CTC) are time efficient for inference and resource efficient to deploy. While end-to-end training of these non-autoregressive models has its benefits, a technical challenge exists when integrating an external language model (LM) with the ASR architecture because the non-autoregressive ASR models may encode lexical patterns in training data which bias the ASR model to recognize as speech words similar to those lexical patterns in the training data and thus may not serve purely as an acoustic model (AM). Despite the accuracy improvements offered by external LM fusion, adaptation to new words or syntax in real-world use of the non-autoregressive ASR models remains a problem for autoregressive ASR models because the autoregressive ASR models outputs are biased towards the sequences of words seen during autoregressive ASR model training. Therefore, in various embodiments, techniques for removing bias from automatic speech recognition models using internal language model estimates and improve the accuracy of the AST model on the target domain are implemented. These techniques address the technical challenges of improving accuracy of ASR models when processing audio data with speech outside of the training data set domain, while not relinquishing the time efficient and resource efficient benefits of using a non-autoregressive ASR model. Such performance improvements may be implemented in a wide variety of speech recognition systems, services, or applications, including, but not limited to, machine transcription with custom vocabulary, generating custom language models, text or voice command recognition and execution, as well as various other natural language processing tasks.

The embodiments described in detail below provide many performance improvements to the field of automatic speech recognition. The lexical-bias problem, the tendency of an ASR model to premeditate rather than observe and emit, can be addressed by determining internal LM estimates, especially for non-autoregressive ASR models, such as CTC based end-to-end ASR architectures (although internal LM estimates can also be used for autoregressive ASR models). These embodiments can improve recall on domain-specific terms since the ASR model will be less biased to words seen during model training. Effective de-biasing can reduce reliance on paired data (human/machine transcribed) for long-tail recognition and personalization, thereby improving the ASR model's ability to generalize. These performance improvements in speech recognition in addition to the more general computing performance improvements in time and resource usage noted above may support providing cost-efficient domain-specific ASR models in variety of different systems, services, or applications. Moreover, as additional training is not required to implement removing bias from automatic speech recognition models using internal language model estimates, these techniques can provide performance improvements without additional effort and cost of data collection that would be required if further training were needed. Furthermore, as these techniques allow for less reliance on domain-specific data for training, these techniques also reduces training time, allowing for shorter development and deployment time frames for new ASR models.

FIG. 1 illustrates a logical block diagram of removing bias from automatic speech recognition models using internal language model estimates, according to some embodiments. Speech recognition system 100 may be a standalone speech recognition system, or implemented as part of another system or application that utilizes recognized speech, such as natural language processing service 210 implemented as part of a provider network. Speech recognition system 100 may obtain audio data 102 (e.g., captured via an audio sensor, such as a microphone or other audio capture device) and generate a speech prediction 142 that is a text prediction of words spoken in a human language in the audio data (or multiple speech predictions, such as may be performed by providing n-best speech predictions) as a response and/or for further natural language processing tasks.

Speech recognition system 100 may implement techniques for removing bias from automatic speech recognition models using internal language model estimates, in various embodiments. For example, the audio data 102 may be processed through speech recognition ML model 120, such as an non-autoregressive ASR model like the CTC ASR model discussed below with regard to FIG. 4, or, in some embodiments, an autoregressive ASR model, such as Recurrent Neural Network Transducer (RNN-T) or attention-based encoder-decoder (AED). Speech recognition ML model 120 may be trained to output token predictions (where a token corresponds to part of a word, a word, or multiple words in a language) that are the speech in the audio data, wherein the combined token predictions makeup the prediction of speech recognized in the audio data. As indicated at 124, original token predictions may be generated and output by speech recognition ML model 120.

As discussed in detail below with regard to FIGS. 4, 5, and 6A, speech recognition system 100 may implement audio masking 110, which may implement a masking scheme, such as a word masking scheme or a partition masking scheme, which generates multiple different masked versions of the audio data 112, each of which may be processed through speech recognition ML model 120 to generate corresponding token predictions for words that are used as internal LM (ILM) estimation token predictions 122. For example, in a word masking scheme, the original token predictions 124 output from speech recognition ML model 120, may be provided to audio masking 110 (as indicated by the dotted line), so that audio masking 110 may mask different words in different masked audio versions 112. In some embodiments, a word masking scheme may selectively mask certain words and not others. For example, words that are nouns or verbs may be iteratively masked in different masked audio versions (e.g., "The dog ran to the park" may be masked as "The [mask] ran to the park", "The dog [mask] to the park" and "The dog ran to the [mask]."), whereas other words, such as articles or prepositions may not be masked (e.g., in the above examples "the" and "to" are not masked).

As discussed in detail below with regard to FIGS. 4, 5, and 6B-6D, ILM estimate token modification 130 may be implemented to compare the ILM estimation token predictions 122 with the original token predictions 124 to recognize those original token predictions exhibiting ILM bias (e.g., by comparing differences between token prediction values with a difference threshold) and remove the ILM bias by modifying the original token predictions 124 for those original token predictions identified to have bias (e.g., one or multiple original tokens may be modified but not all original token predictions may be modified in some scenarios).

Speech recognition system 100 may implement token prediction decoder 140 which may take modified token predictions 132 and generate speech prediction 142. For example, additional decoding techniques such as a beam search technique may be implemented. The modified token predictions 132 may be decoded into a completed speech prediction (e.g., word, words, phrase, sentence, paragraph, or other set of text in a language).

Figure 3:
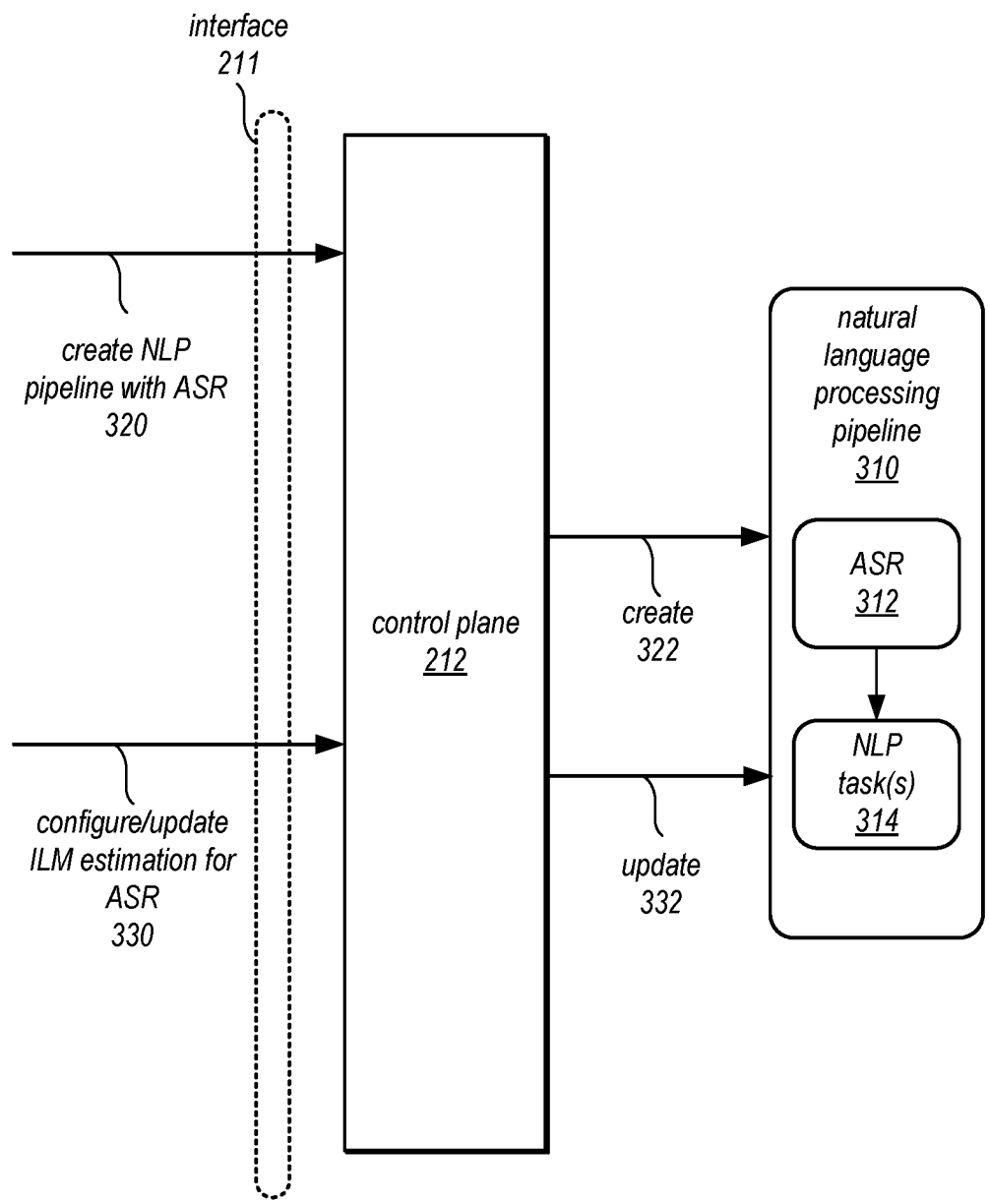
FIG. 3 illustrates a logical block diagram of different interactions to create and update a natural language processing pipeline, according to some embodiments.

In at least some embodiments, various aspects of removing bias from automatic speech recognition models using internal language model estimates may be configurable to adjust the sensitivity or performance of the technique. FIG. 3, discussed below, provides examples of hyperparameters which can be specified or adjusted in some embodiments.

Please note that the previous description of removing bias from automatic speech recognition models using internal language model estimates is a logical illustration and thus is not to be construed as limiting as to the implementation of a speech recognition system.

This specification continues with a general description of a provider network that implements multiple different services, including a natural language processing service, which may implement removing bias from automatic speech recognition models using internal language model estimates. Then various examples of, including different components/modules, or arrangements of components/module that may be employed as part of implementing the services are discussed. A number of different methods and techniques to implement removing bias from automatic speech recognition models using internal language model estimates are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
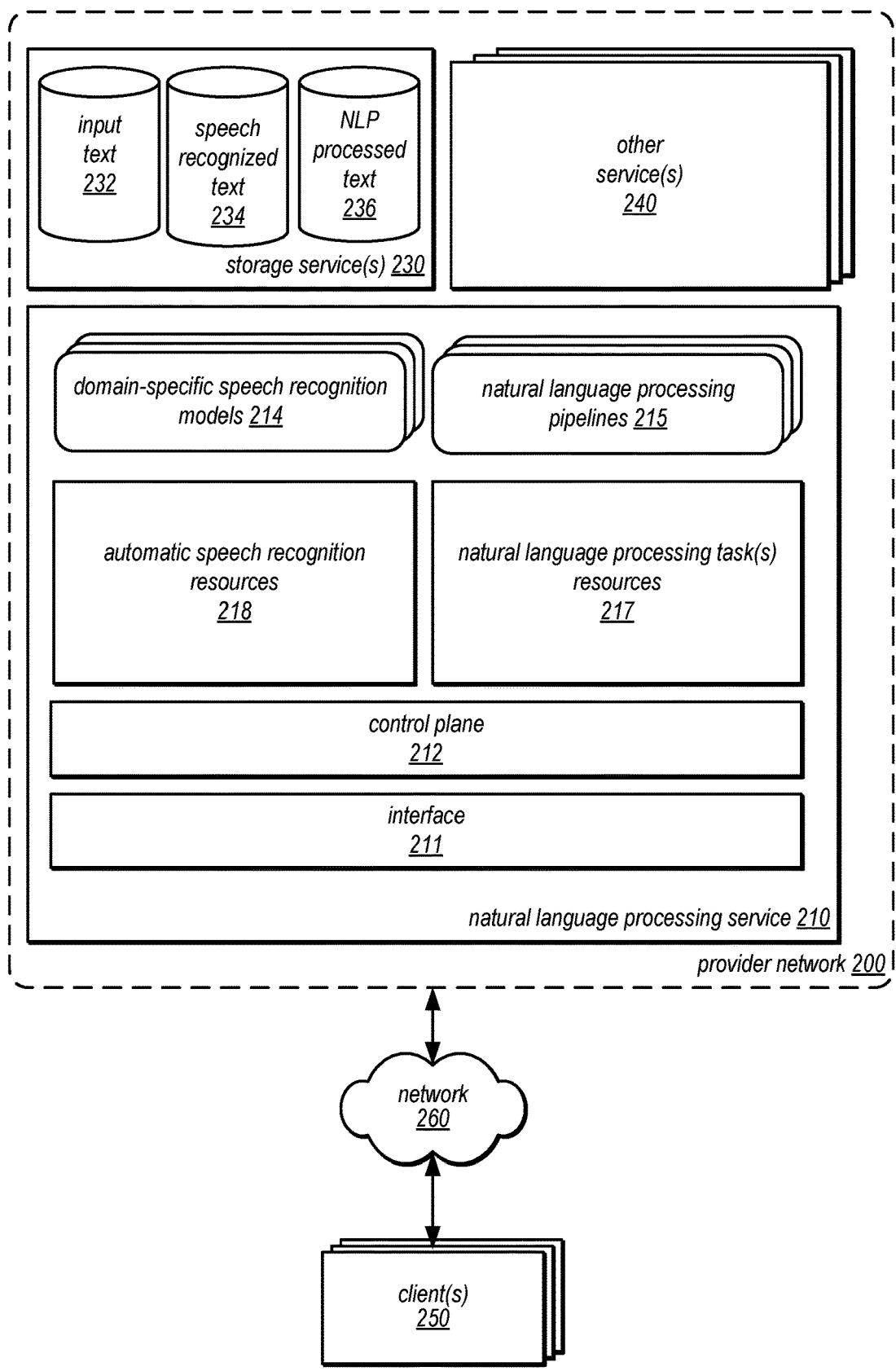
FIG. 2 illustrates an example provider network that may implement natural language processing service that implements removing bias from automatic speech recognition models using internal language model estimates, according to some embodiments, according to some embodiments.

FIG. 2 illustrates an example provider network that may implement natural language processing service that implements removing bias from automatic speech recognition models using internal language model estimates, according to some embodiments, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 7), needed to implement and distribute the infrastructure and services offered by the provider network 200, in one embodiment. In some embodiments, provider network 200 may implement various computing resources or services, such as natural language processing service(s) 210, storage service(s) 230, and/or any other type of network-based services 240 (which may include a virtual compute service and various other types of storage, database or data processing, analysis, communication, event handling, visualization, data cataloging, data ingestion (e.g., ETL), and security services), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 7 and described below, in one embodiment. In various embodiments, the functionality of a given system or service component (e.g., a component of natural language processing service 210 may be implemented by a particular node or may be distributed across several nodes. In some embodiments, a given node may implement the functionality of more than one service system component (e.g., more than one data store component).

Natural language processing service 210 may implement interface 211 to allow clients (e.g., client(s) 250 or clients implemented internally within provider network 200, such as a client application hosted on another provider network service like an event driven code execution service or virtual compute service) to send requests to perform natural language processing tasks, including natural language processing tasks that include automatic speech recognition on audio data. In at least some embodiments, natural language processing service 210 may support various types of natural language processing tasks, including transcription, translation, voice command or speech-based events, in some embodiments. For example, natural language processing service 210 may implement interface 211 (e.g., a graphical user interface, programmatic interface that implements Application Program Interfaces (APIs) and/or a command line interface) may be implemented so that a client application can create or otherwise manage domain-specific speech recognition models 214, natural language processing pipelines 215, and/or input text 232, speech recognized text 234, or NLP processed text 236 stored in storage service(s) 230, or other storage locations or sources within provider network 200 or external to provider network 200 (e.g., on premise data storage in private networks).

Natural language processing service 210 may implement a control plane 212 to perform various control operations to implement the features of natural language processing service 210. For example, control plane 212 may monitor the health and performance of requests at different components of automatic speech recognition resources 218 and natural language processing tasks resources (e.g., the health or performance of various nodes, instances, servers, or other computing resources implementing these features of natural language processing service 210). If a node fails, a request fails, or other interruption occurs, control plane 212 may be able to restart a job to complete a request (e.g., instead of sending a failure response to the client). Control plane 212 may, in some embodiments, may arbitrate, balance, select, or dispatch requests to different node(s) in various embodiments. For example, control plane 212 may receive requests interface 211 which may be a programmatic interface, and identify an available computing to begin work on the request.

Automatic speech recognition resources 218 may be various computing resources that host domain-specific speech recognition models 214 and accept audio data for performing ASR tasks to generate speech predictions, similar to speech recognition system 100 discussed above with regard to FIG. 1. Similarly, natural language processing task(s) resources 217 may be various computing resources that host various other machine learning models, applications, or other features that perform natural language processing tasks.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also include various kinds relational or non-relational databases, in some embodiments. Data storage service(s) 230 may include object or file data stores for putting, updating, and getting data objects or files, in some embodiments. Data storage service(s) 230 may be accessed via programmatic interfaces (e.g., APIs) or graphical user interfaces. Input text 232, speech recognized text 234, or NLP processed text 236 may be put and/or retrieved from data storage service(s) 230 via an interface for data storage services 230, in some embodiments.

Generally speaking, clients 250 may encompass any type of client that can submit network-based requests to provider network 200 via network 260, including requests for natural language processing service 210 (e.g., a request to process audio data in a natural language processing pipeline 215). For example, a given client 250 may include a suitable version of a web browser, or may include a plug-in module or other type of code module that can execute as an extension to or within an execution environment provided by a web browser. Alternatively, a client 250 may encompass an application (or user interface thereof), a media application, an office application or any other client application that may make use of natural language processing service 210 (or other provider network 200 services) to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. Clients 250 may convey network-based services requests (e.g., requests to interact with services like machine translation service 210) via network 260, in one embodiment. In various embodiments, network 260 may encompass any suitable combination of networking hardware and protocols necessary to establish network-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

As noted above, natural language processing service 210 may implement natural language processing pipelines 215 which may include ASR tasks as well as other natural language processing tasks. FIG. 3 illustrates a logical block diagram of different interactions to create and update a natural language processing pipeline, according to some embodiments. Interface 211 may support various requests to control plane 212 on behalf of different users, accounts, or jobs, in some embodiments. For example, a create NLP pipeline with ASR request 320 may be submitted. The create NLP pipeline request 320 may identify the domain-specific ASR models, external LM, as well as various other machine learning models, tools, or applications that can perform downstream NLP tasks (e.g., commands, translations, or various other NLP processing on speech predictions generated by ASR model 312).

Control plane 212 may create 322 (e.g., as a template, executable code or scripts, or other format), natural language processing pipeline 310 as specified by request 320, in some embodiments. For example, the identifier for ASR model 312 may be included along with the requested NLP task(s) 314 in the request.

In some embodiments, ILM estimation techniques as discussed above with regard to FIG. 1 and below with regard to FIGS. 4-6D, may be configured via a request 330. For example, masking schemes may be selected and/or defined (e.g., a selection of a partition masking scheme along with a number or size of partitions). Other hyperparameters may include the threshold values for determining when bias exists (e.g., θ as discussed below) or the application of blank token handling (e.g., γ as discussed below). Correspondingly, updates 332 may be made to the natural language processing pipeline 310 to configure ILM estimation for ASR 312.

As discussed above, CTC ASR models may provide performant end-to-end speech recognition. FIG. 4 illustrates a logical block diagram of removing bias from automatic speech recognition models using internal language model estimates for a CTC architecture for automatic speech recognition, according to some embodiments. However, these techniques may be applicable to different ASR models, including auto-regressive ASR models.

ASR processing 410 (e.g., implemented on ASR resources 218 in FIG. 2) may implement masked audio generation 420. Masked audio generation 420 which may apply a masking scheme to generate different masked versions of audio data 402. These different masked audio versions may then be input to CTC head 430 which may provide token predictions for each masked version of audio data 402. ILM estimation 440 may combine these token predictions into ILM token estimates which may be compared with token predictions output from the non-masked audio data 402 provided to CTC 430 and then output to token probability determination 450.

Because the strength of bias removal that may be applied at token probability determination 450 (e.g., when subtracting ILM token prediction values from original token prediction values as discussed below with regard to FIG. 5), normalization 460 may be performed to ensure that the modified token predictions are in an expected format for beam search decoder 470 (e.g., add up to 100%). Beam search decoder 470 may then take the normalized, modified tokens to generate one or multiple speech predictions according to the token predictions. Speech prediction selection 480 may provide a single (e.g., highest scoring) speech prediction 482 or an n-best set of speech predictions for downstream NLP tasks 490.

Figure 4:
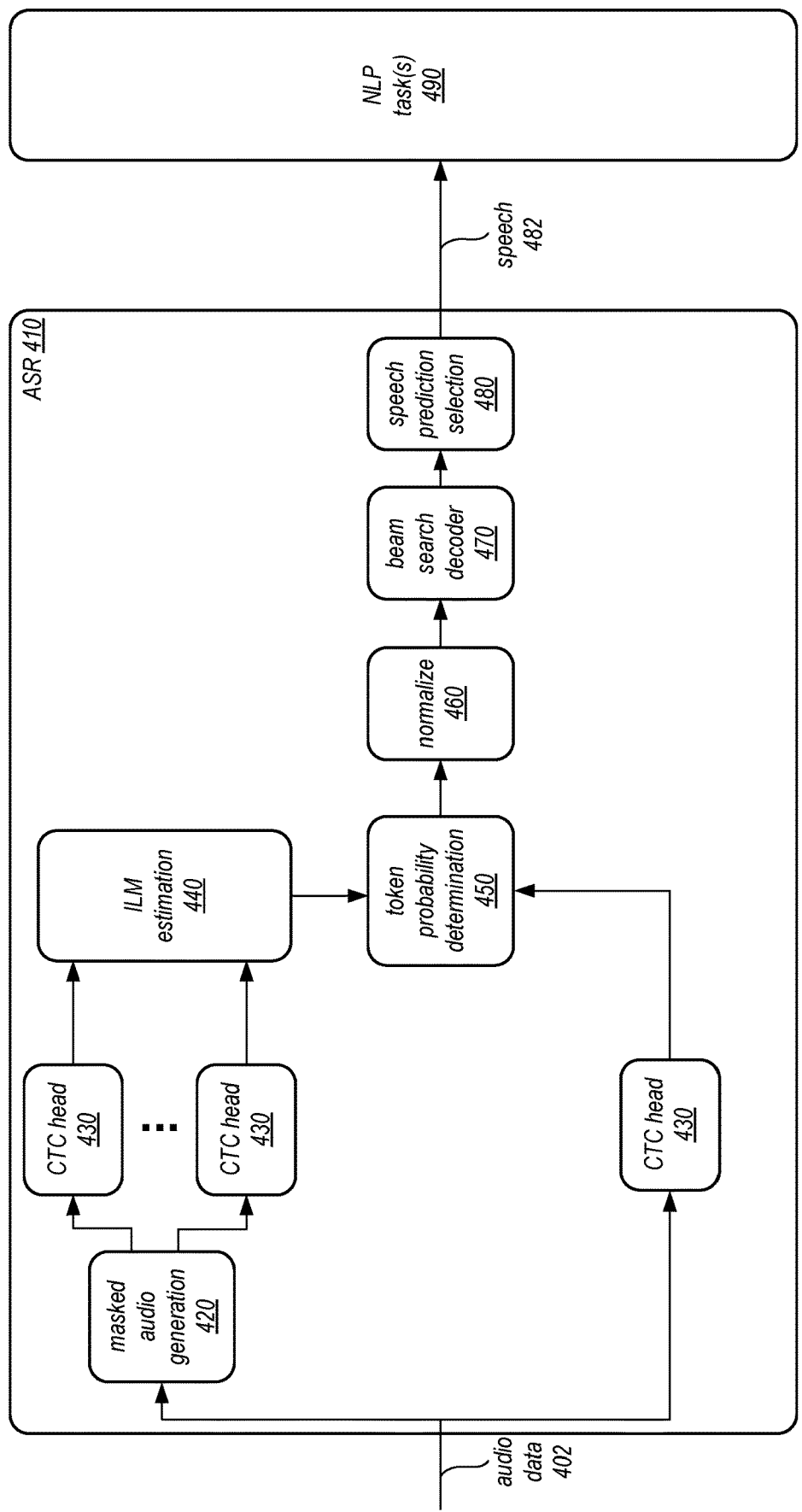
FIG. 4 illustrates a logical block diagram of removing bias from automatic speech recognition models using internal language model estimates for a Connectionist Temporal Classification architecture for automatic speech recognition, according to some embodiments.

Although FIGS. 2-4 have been described and illustrated in the context of a provider network implementing a natural language processing service, the various components illustrated and described in FIGS. 2-4 may be easily applied to other systems that implement speech recognition, either standalone systems or implemented as a feature of a larger application. As such, FIGS. 2-4 are not intended to be limiting as to other embodiments of removing bias from automatic speech recognition models using internal language model estimates.

Figure 5:
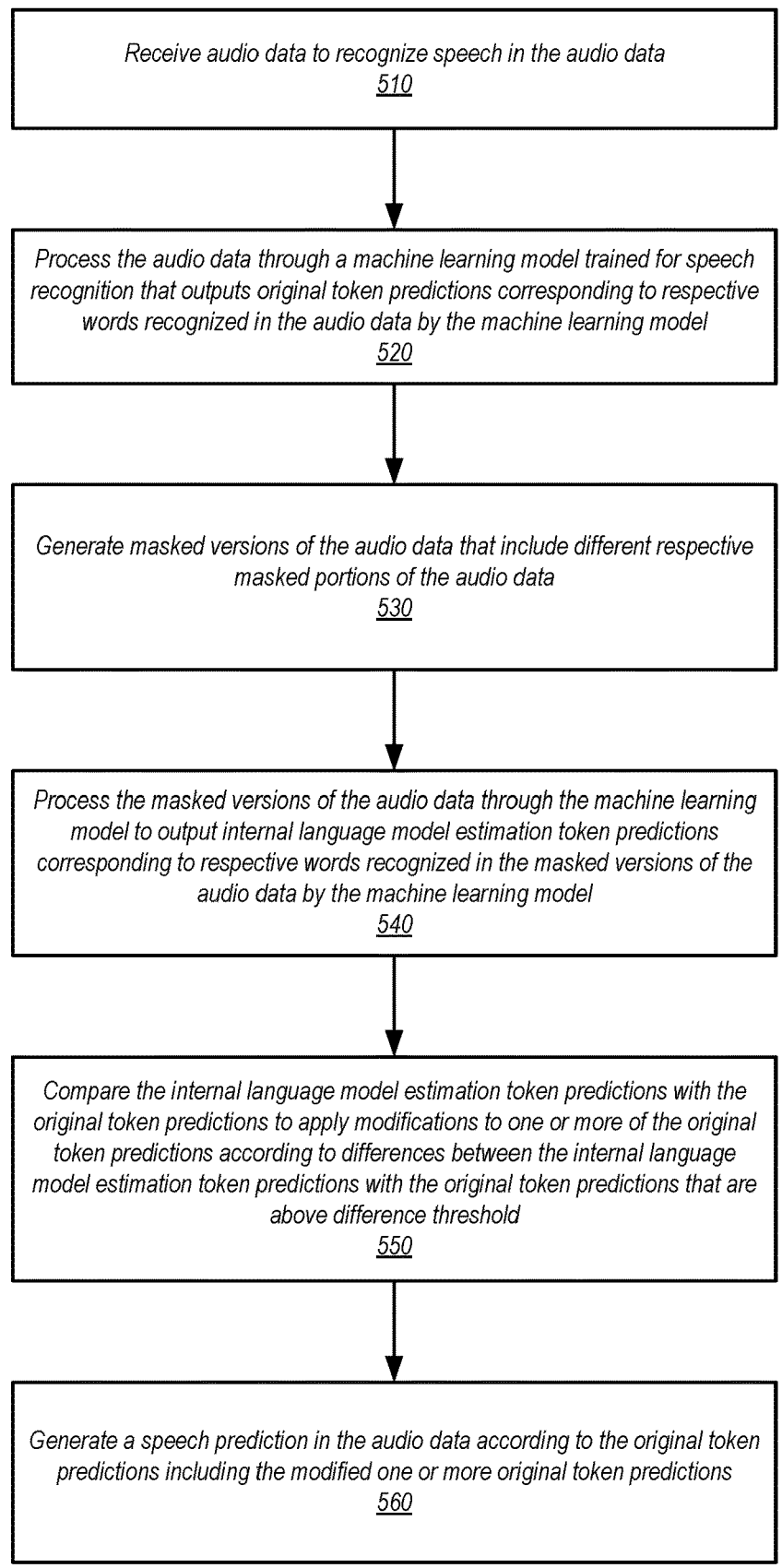
FIG. 5 illustrates a high-level flowchart of various methods and techniques to implement removing bias from automatic speech recognition models using internal language model estimates, according to some embodiments.
Figure 6A:
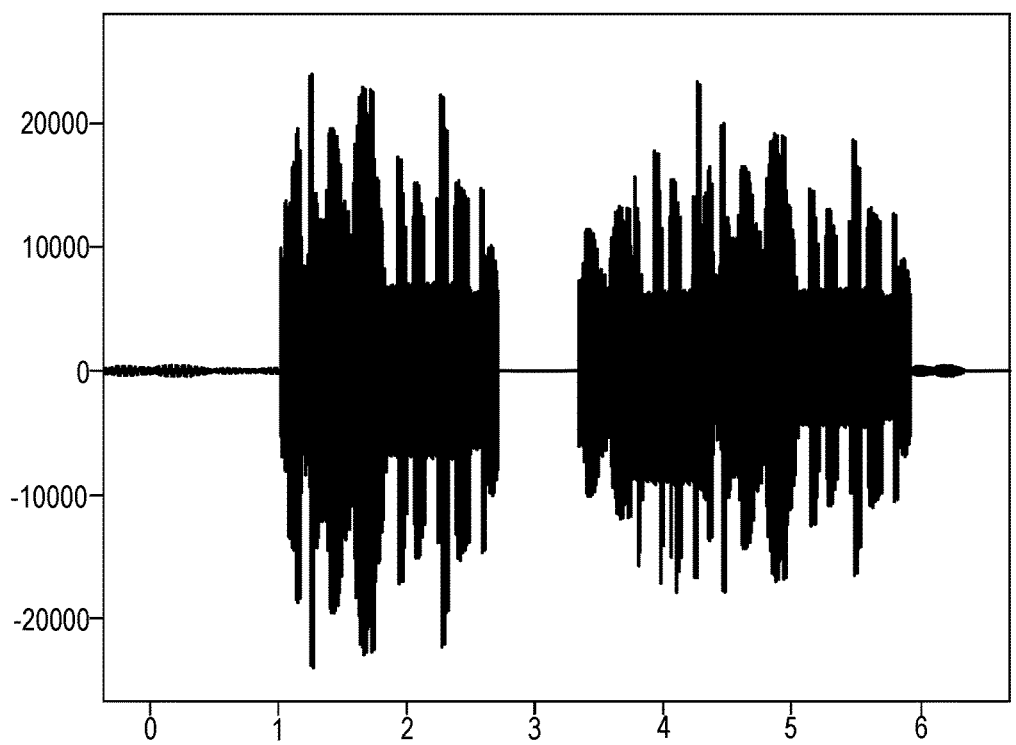
FIG. 6A illustrates a masked version of audio data generated according to a masking scheme, according to some embodiments.

FIG. 5 illustrates a high-level flowchart of various methods and techniques to implement removing bias from automatic speech recognition models using internal language model estimates, according to some embodiments. Various different systems and devices may implement the various methods and techniques described below, either singly or working together. Therefore, the above examples and or any other systems or devices referenced as performing the illustrated method, are not intended to be limiting as to other different components, modules, systems, or devices.

For example, given an input sequence of speech features $X=\{x1, \ldots, xT\}$ and the corresponding output token sequence $Y=\{y1, \ldots, yL\}$, the objective of an ASR model, θ, is to estimate the posterior distribution $P(Y|X;\theta)$. In some embodiments, log-posteriors are computed for numeric stability. Finally, the optimal transcription $\hat{Y}$ is determined from these log-posteriors using an autoregressive beam search algorithm with the criteria: $\hat{Y}=\arg\max_Y [\log P(Y|X; \theta_{ASR}^S)]$, in some embodiments. A beam search algorithm may explore word token predictions to determine a predetermined number of speech predictions by constructing a search tree, generating successor states at each level using a predetermined number of best states (the beam width).

In some embodiments, also referred to as text-only adaptation, in LM fusion, a separately trained target domain LM, $\theta_{LM}^T$, is an external LM model combined with the source domain ASR model, $\theta_{ASR}^S$, to bias the system to output text with target domain semantics. Shallow Fusion is one example of a technique that performs LM fusion. In this approach, the log-posteriors of the source domain ASR model are interpolated with target domain LM log-probabilities during inference. The weighted log-scores are then used to select the output token at each step of beam search using the criteria: $\hat{Y}=\arg\max_Y [\log P(Y|X; \theta_{ASR}^S)+\lambda_T \log P(Y; \theta_{LM}^T)]$, where $P(Y; \theta_{LM}^T)$ is the probability assigned to the token sequence Y by the target domain LM, and $\lambda_T$ is the target LM weight. In some embodiments, the external LM model may be trained in the same domain as the ASR model and still may be fused with the results of the ASR technique.

An ILM estimation technique may estimate the model's internal LM, $P(Y; \theta_{ASR}^S)$, in an autoregressive manner: $P(Y; \theta_{ASR}^S)=\Pi_{l=1}^L P(y_l|Y_{1:l-1}; \theta_{ASR}^S)$, which lends itself naturally to AED and RNN-T models. As these models perform autoregressive decoding, they can include of a parametric component that can be identified as learning probabilities over token sequences—for AED models this would be the decoder network, and for RNN-T models it would be the prediction network. In contrast, CTC models compute log-posteriors in a non-autoregressive fashion, where $Y=\{y_1, \ldots, y_T\}$ output tokens (including blank tokens) corresponding to each input timestep $x_t$. Hence, there is no separate parametric component for tokens. The CTC loss also has an inherent conditional independence between the output tokens Y, given the input X. However, the self-attention and convolution mechanisms in transformer and conformer-based neural architectures implicitly relaxes the conditional independence, due to the sequence-level interdependence of the intermediate features from attention and convolution. Therefore, CTC models may still inadvertently learn an internal LM. Additionally, the non-autoregressive architecture of CTC models makes it unable to be structurally decomposed into corresponding acoustic and language components, which is a precursor to eliminating the acoustic input for conventionally estimating the internal LM.

The ILM is the model's bias in the absence of any acoustic context. Consequently, the above challenges for ILM estimate with models by implementing an iterative input masking approach. The input audio may be masked multiple times and iteratively perform forward pass to determine the log-posteriors for the corresponding masked timesteps. The log-posteriors may then be accumulated for different groups of masked timesteps and normalize them in the posterior domain to compute the final internal LM distribution.

As indicated at 510, audio data may be received to recognize speech in the audio data, in some embodiments. As indicated at 520, the audio data may be processed through a machine learning model trained for speech recognition that outputs original token predictions corresponding to respective words recognized in the audio data by the machine learning model.

As indicated at 530, masked versions of the audio data that include different respective masked portions of the audio data may be generated. For example, different masking schemes may be used. One masking scheme may be word masking scheme, where the audio is iteratively silenced at each word boundary determined from the original token prediction boundaries, effectively hiding the audio for each spoken word from the ASR model. Another example of a masking scheme is partition masking, where the audio is split into k equal partitions and each partition is silenced iteratively before being passed to the ASR model. FIG. 6A illustrates an example of an applied mask to an audio data waveform (e.g., the middle portion of the waveform has been masked).

As indicated at 540, the masked versions of the audio data may be processed through the machine learning model to output internal language model estimation token predictions corresponding to respective words recognized in the masked versions of the audio data by the machine learning model, in some embodiments. As indicated at 550, the internal language model estimation token predictions may be compared with the original token predictions to apply modifications to one or more of the original token predictions according to differences between the internal language model estimation token predictions with the original token predictions that are above difference threshold, according to some embodiments. For example, token prediction scores may be log probabilities in some embodiments (as discussed above).

The internal language model estimation token predictions may be accumulated across the different masked versions of the audio data. Then, an internal language model estimate may correspond to log probabilities that the ASR model would emit if there is not audio in the corresponding input frames.

Figure 6B:
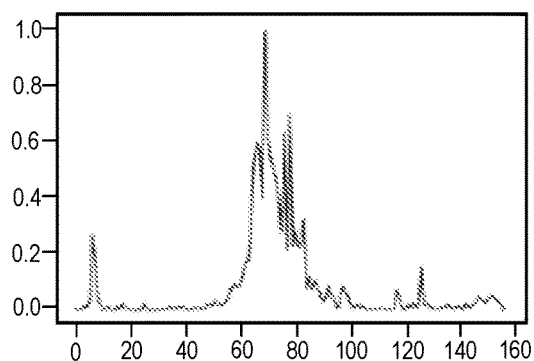
FIGS. 6B-6D illustrate different comparisons of token predictions to determine internal language model estimates, according to some embodiments.
Figure 6C:
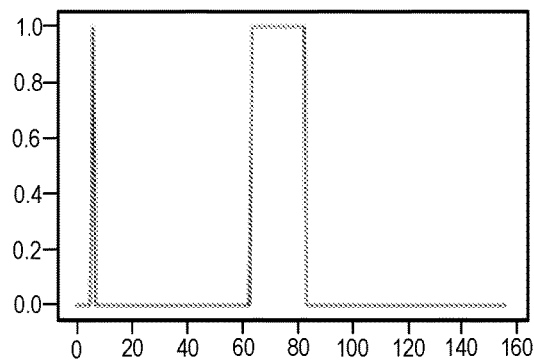
Figure 6D:
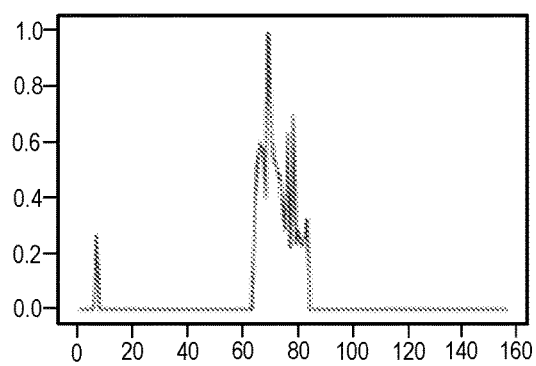

FIG. 6B illustrates one example comparison, wherein the maximum absolute difference (y-axis) is shown between the masked and original scores for each frame (x-axis). FIG. 6C illustrates the application of a different threshold, such as frames where the maximum absolute difference is greater than difference threshold of 0.25. In FIG. 6D, a condensed representation of ILM for one particular masked audio version is illustrated.

The final scores may then be obtained by subtracting the ILM log probabilities from the original log probabilities. In some scenarios, such as CTC-based models, there may be an internal blank token which does not correspond to any language semantics. In these scenarios, the blank token log probability may be handled differently. For example, subtracting the ILM for the timesteps where blank token is originally predicted with a high confidence (e.g., above a threshold $\gamma$) may be skipped.

As indicated at 560, a speech prediction may be generated in the audio data according to the original token predictions including the modified one or more original token predictions, in some embodiments. For example, as discussed above, a beam search decoder may take the token probabilities (including the modified token probabilities) and generate one or more speech predictions according to the individual token probabilities.

The following example describes the application of the above technique for a CTC embodiment, as illustrated above with regard to FIG. 4. These techniques can be used for other ASR models as well. Given an input speech sequence $X=\{x_1, \ldots, x_T\}$, divide the input timesteps into K equal, non-overlapping partitions, and eliminate the input for each partition, yielding a set of K masked sequences $\{\tilde{X}_1, \ldots, \tilde{X}_T\}$ such that:

$$\tilde{x}_t^{(k)} = \begin{cases} 0, & \text{if } t_{k-1} \leq t < t_k \\ x_i & \text{otherwise} \end{cases}$$

where $\tilde{x}_t^{(k)}$ is the input at t for $\tilde{X}_k$ also $t_0=1$ and $t_k=KT/K$.

First, denote the log-posterior distribution for tokens $\{\mu_1, \ldots, \mu_N\}$ computed by the CTC model at timestep t for input sequence X as:

$$\Psi_t(X) = \begin{bmatrix} \log P(y_t = \mu_1 | X; \theta_{CTC}^S) \\ \vdots \\ \log P(y_t = \mu_N | X; \theta_{CTC}^S) \end{bmatrix}$$

Next, compute the log-posterior distribution vector for a given masked sequence $\Psi_t(\tilde{X}_k)$. Then, determine whether these log-probabilities correspond to the original acoustic input or if they are affected by the acoustic masking. In the latter case, it would indicate the model's bias when no acoustic information was passed, and hence it would correspond to the model's ILM. For this, it may determine the element-wise absolute difference between the log-posterior distributions as $\epsilon_t^j = |\Psi_t(\tilde{X}_k) - \Psi_t(X)|$. Intuitively, if all elements of the vector $\epsilon_t^k$ have relatively low values, say below some threshold $\gamma$, it means timestep t is unaffected by the Kth masking, and this can be ignored in the ILM computation. Conversely, it may keep $\Psi_t(\tilde{X}_k)$ for the ILM computation if $\epsilon_t^k$ has any relatively high values, as it indicates the model bias that is affected by the masking.

Hence, take the maximum of the N values in the vector $\epsilon_t^k$, denote it as $\delta_t^k$, and normalize it across all timesteps to determine a scalar $\hat{\delta}_t^k$ that can compare against a threshold $\gamma$ for determining whether $\Psi_t(\tilde{X}_k)$ will contribute to the ILM. More concretely $$\delta_t^k = \max_n(\epsilon_t^k); \quad \hat{\delta}_t^k = \frac{\delta_t^k}{\max_{t'}(\delta_{t'}^k)}$$

Finally, estimate the ILM for timestep t by computing a pseudo log-likelihood using the log-posterior distributions across all K masks conditioned on whether the corresponding $\hat{\delta}_t^k$ is above a threshold $\gamma$. Therefore, $$\log P_{ILM}(y_t; \theta_{CTC}^S) = \text{LogSoftmax}\left(\sum_{k=1}^{K} \Psi_t(\tilde{X}_k)\left[\hat{\delta}_t^k > \gamma\right]\right)$$

Although it may be shown that the ILM computation for a single timestep t, all the steps discussed are easily vectorizable in the sequence dimension, and can be computed for all timesteps in parallel using efficient sub-linear methods. The main overhead comes from the multiple forward passes required to compute the log-posteriors across all masks, which introduces a cost that scales linearly with K. This can be mitigated in part by doing one batched forward pass with the original and masked inputs in the same batch.

For inference with ILME, a similar approach as described above may be implemented, subtracting the ILM pseudo log-likelihood from the original CTC log-posterior. However, CTC models have a special blank token that is purely functional and does not correlate with any language semantics. Therefore, subtracting the ILM for the timesteps where blank token is originally predicted may be skipped. However, given the behavior of CTC models, the timesteps for blank token may be skipped only when the model assigns it a high likelihood in the posterior domain, in some embodiments, above some threshold $\beta$:

if $P_{CTD}(y_t=(\text{blank})|X)<\beta$,
    $\text{SCORE}(y_t)=\log P_{CTC}(y_t|X)-\log P_{ILM}(y_t)$
else, $\text{SCORE}(y_t)=\log P_{CTC}(y_t|X)$ Finally, these modified log-posterior scores, $\text{SCORE}(y_t)$, may be passed to beam search for performing inference combined with shallow fusion, as discussed above.

The methods described herein may in various embodiments be implemented by any combination of hardware and software. For example, in one embodiment, the methods may be implemented on or across one or more computer systems (e.g., a computer system as in FIG. 7) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 7:
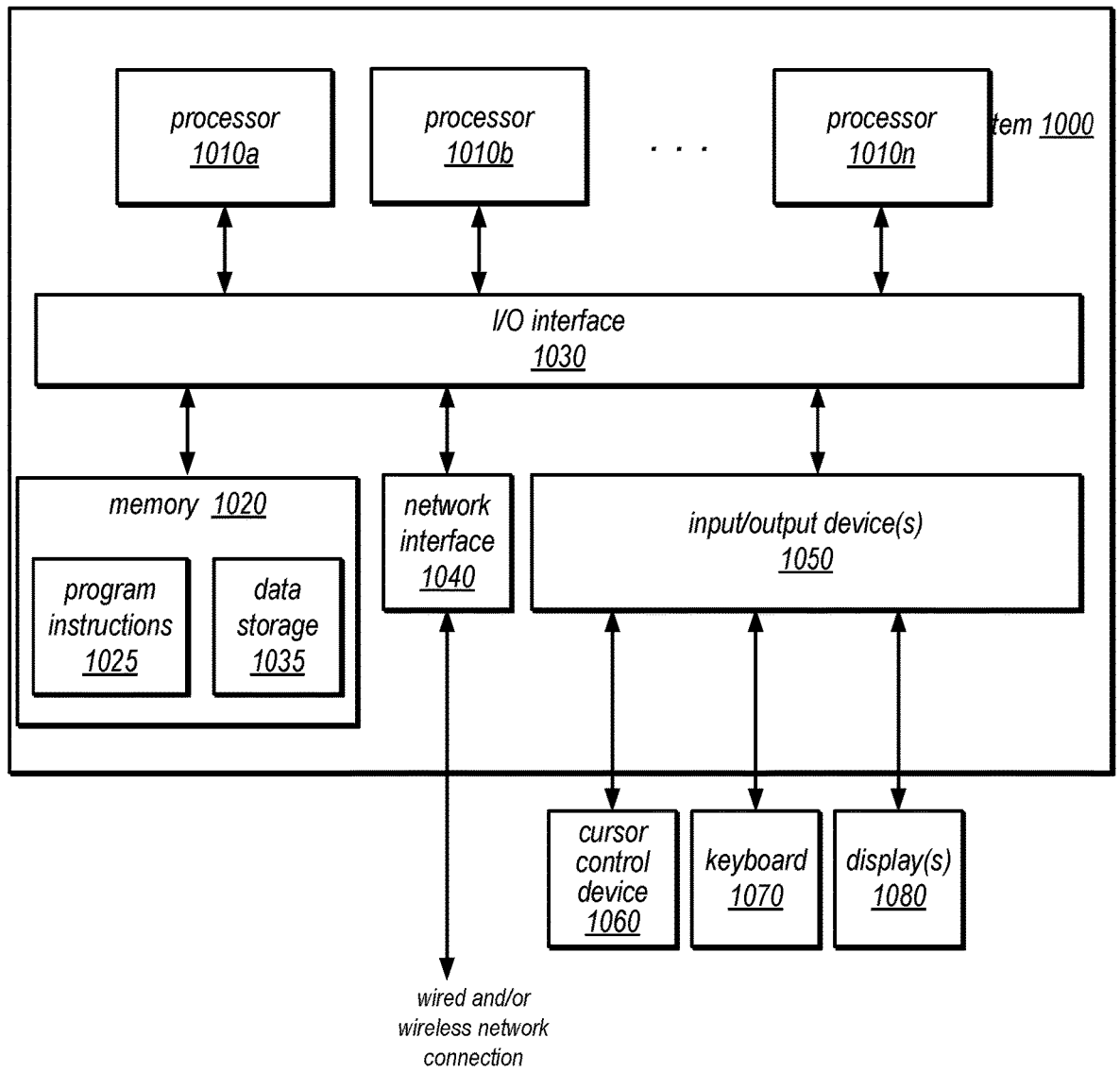
FIG. 7 illustrates an example system to implement the various methods, techniques, and systems described herein, according to some embodiments.

Embodiments of selectively tuning machine translation models for custom machine translations as described herein may be executed on one or more computer systems, which may interact with various other devices. One such computer system is illustrated by FIG. 7. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as ratio mask post-filtering for audio enhancement as described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 7, memory 1020 may include program instructions 1025, that implement the various methods and techniques as described herein, including the application of self-supervised training for audio anomaly detection and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to implement a speech recognition system, configured to:
      receive audio data to recognize speech in the audio data;
      cause the audio data to be processed through a machine learning model trained for speech recognition that outputs original token predictions corresponding to respective words recognized in the audio data by the machine learning model;
      generate a plurality of masked versions of the audio data, wherein individual ones of plurality of masked version of the audio data comprise different respective masked portions of the audio data;
      cause the plurality of masked versions of the audio data to be processed through the machine learning model to output internal language model estimation token predictions corresponding to respective words recognized in the plurality of masked versions of the audio data by the machine learning model;
      compare the internal language model estimation token predictions with the original token predictions to determine modifications to one or more of the original token predictions according to differences between the internal language model estimation token predictions with the original token predictions that are above difference threshold;
      apply the modifications to the one or more original token predictions; and
      generate a speech prediction in the audio data according to the original token predictions including the modified one or more original token predictions.

2. The system of claim 1, wherein to generate the speech prediction in the audio data according to the original token predictions including the modified one or more original token predictions, the speech recognition system is configured to apply a beam search technique using the original token predictions fused with an external machine learning language model.

3. The system of claim 1, wherein the different respective masked portions correspond to different ones of equal partitions of the audio data.

4. The system of claim 1, wherein the speech recognition system is implemented as part of a natural language processing service offered by a provider network and wherein the speech prediction is provided to one or more other resources of the natural language processing service to perform a natural language processing task on the speech prediction.

5. A method, comprising:
   receiving, at a speech recognition system, audio data to recognize speech in the audio data;
   processing, by the speech recognition system, the audio data through a machine learning model trained for speech recognition that outputs original token predictions corresponding to respective words recognized in the audio data by the machine learning model;
   generating, by the speech recognition system, a plurality of masked versions of the audio data, wherein individual ones of plurality of masked version of the audio data comprise different respective masked portions of the audio data;
   processing, by the speech recognition system, the plurality of masked versions of the audio data through the machine learning model to output internal language model estimation token predictions corresponding to respective words recognized in the plurality of masked versions of the audio data by the machine learning model;
   comparing, by the speech recognition system, the internal language model estimation token predictions with the original token predictions to apply modifications to one or more of the original token predictions according to differences between the internal language model estimation token predictions with the original token predictions that are above difference threshold; and
   generating, by the speech recognition system, a speech prediction in the audio data according to the original token predictions including the modified one or more original token predictions.

6. The method of claim 5, wherein the machine learning model is a non-autoregressive model.

7. The method of claim 5, wherein generating the speech prediction in the audio data according to the original token predictions including the modified one or more original token predictions comprises applying a beam search technique using the original token predictions fused with an external machine learning language model.

8. The method of claim 5, wherein generating the plurality of masked versions of the audio data is performed according to a masking scheme to select the different respective masked portions, and wherein the masking scheme is specified according to a request received via an interface of the speech recognition system.

9. The method of claim 5, wherein the different respective masked portions correspond to different ones of equal partitions of the audio data.

10. The method of claim 5, wherein the machine learning model is a deep neural network trained according to Connectionist Temporal Classification (CTC) technique, and wherein a blank token of the original token predictions output by the machine learning model is not modified according to the comparing.

11. The method of claim 5, wherein the difference threshold is specified according to a request received via an interface of the speech recognition system.

12. The method of claim 5, wherein the speech prediction is one of a plurality of possible speech predictions generated using the original token predictions including the modified one or more original token predictions.

13. The method of claim 5, wherein the speech recognition system is implemented as part of a natural language processing service offered by a provider network and wherein the speech prediction is provided to one or more other resources of the natural language processing service to perform a natural language processing task on the speech prediction.

14. One or more non-transitory, computer-readable storage media, storing program instructions that when executed on or across one or more computing devices cause the one or more computing devices to implement:
  receiving audio data to recognize speech in the audio data;
  causing the audio data to be processed through a machine learning model trained for speech recognition that outputs original token predictions corresponding to respective words recognized in the audio data by the machine learning model;
  generating a plurality of masked versions of the audio data, wherein individual ones of plurality of masked version of the audio data comprise different respective masked portions of the audio data;
  causing the plurality of masked versions of the audio data to be processed through the machine learning model to output internal language model estimation token predictions corresponding to respective words recognized in the plurality of masked versions of the audio data by the machine learning model;
  comparing the internal language model estimation token predictions with the original token predictions to apply modifications to one or more of the original token predictions according to differences between the internal language model estimation token predictions with the original token predictions that are above difference threshold; and
  generating a speech prediction in the audio data according to the original token predictions including the modified one or more original token predictions.

15. The one or more non-transitory, computer-readable storage media of claim 14, wherein the machine learning model is an autoregressive model.

16. The one or more non-transitory, computer-readable storage media of claim 14, wherein, in generating the speech prediction in the audio data according to the original token predictions including the modified one or more original token predictions, the program instructions cause the one or more computing devices to implement applying a beam search technique using the original token predictions.

17. The one or more non-transitory, computer-readable storage media of claim 14, wherein generating the plurality of masked versions of the audio data is performed according to a masking scheme to select the different respective masked portions, and wherein the masking scheme is specified according to a request received via an interface of a speech recognition system.

18. The one or more non-transitory, computer-readable storage media of claim 14, wherein the different respective masked portions correspond to different words in the audio data.

19. The one or more non-transitory, computer-readable storage media of claim 14, wherein the difference threshold is specified according to a request received via an interface of the speech recognition system.

20. The one or more non-transitory, computer-readable storage media of claim 14, wherein the one or more computing devices are implemented as part of a natural language processing service offered by a provider network and wherein the speech prediction is provided to one or more other resources of the natural language processing service to perform a natural language processing task on the speech prediction.

* * * * *